United States Patent [19]
Jouwsma

[11] Patent Number: 5,357,793
[45] Date of Patent: Oct. 25, 1994

[54] FLUID METERING APPARATUS

[75] Inventor: Wijbren Jouwsma, Lochem, Netherlands

[73] Assignee: Bronkhorst High-Tech B.V., Ruurlo, Netherlands

[21] Appl. No.: 991,157

[22] Filed: Dec. 16, 1992

[30] Foreign Application Priority Data

Mar. 6, 1992 [NL] Netherlands ............. 9200414

[51] Int. Cl.$^5$ ............................................. G01F 5/00
[52] U.S. Cl. ................................ 73/202; 138/40; 138/42
[58] Field of Search ................ 138/37, 40, 42; 251/127; 137/625.28, 625.30; 210/224, 231, 232, 299, 435, 445, 453, 488; 73/202, 202.5

[56] References Cited

U.S. PATENT DOCUMENTS

| | | | |
|---|---|---|---|
| 3,349,619 | 10/1967 | Millar | 73/861.52 |
| 3,792,609 | 2/1974 | Blair et al. | 73/861.52 |
| 3,827,568 | 8/1974 | Toth et al. | 210/488 |
| 3,851,526 | 12/1974 | Drexel | 138/42 |
| 3,856,049 | 12/1974 | Scull | 138/42 |
| 4,015,473 | 4/1977 | Kleuters et al. | 73/861.52 |
| 4,079,754 | 3/1978 | Porter | 138/42 |
| 4,427,030 | 1/1984 | Jouwsma | 138/42 |
| 4,517,089 | 5/1985 | Arnaud | 210/488 |
| 4,709,863 | 12/1987 | Szkaradek et al. | 210/488 |
| 4,938,053 | 7/1990 | Jepson et al. | 73/202 |
| 5,249,626 | 10/1993 | Gibbins | 210/488 |

FOREIGN PATENT DOCUMENTS 767047 1/1957 United Kingdom .
2123564 2/1984 United Kingdom .

OTHER PUBLICATIONS

Bronkhorst Hi-Tec Mass Flow and Pressure Measurement and Control Bulletin Dated Jan. 1994.

Primary Examiner—Stanley S. Silverman
Assistant Examiner—Robert James Popovics
Attorney, Agent, or Firm—Rosen, Dainow & Jacobs

[57] ABSTRACT

Device for measuring pressure differences or mass portions in a fluid flow—gas or liquid—and/or for implementing processes for mixing fluids, whereby when in use the fluid flows into the device, then passes a part therein where the fluid flow is laminar and the flow measurement is made, and finally flows out of the device, whereby the device has a turbulence filter which is integrated therein, with a settling chamber behind it. The fluid then first flows through that filter, so that a laminar flow leads to the flow measuring element.

6 Claims, 3 Drawing Sheets

FLUID METERING APPARATUS

BACKGROUND OF THE INVENTION

1. Technical Field

The invention relates to a laminar flow element with an integrated turbulence filter.

2. Description of the Related Art

Such a device is described, for example, in European patent application no. 82201059.1, publication no. 0075343, corresponding to U.S. Pat. No. 4,427,030. Pressure differences and mass portions in a fluid flow channel are determined in the basis of measurements which are taken from a part of a fluid flow—the measurement flow—which is branched-off the main flow, and which flow is passed through a thin, tubular-shaped measuring channel, in which the flow is laminar. A laminar flow is defined as a flow whereby the liquid flows over itself as if it were in layers. Such a flow is stabile at flow speeds which correspond with a Reynolds number lower than 2300. The Reynolds number is the number which show the relationship in a flow between the speed of the mass and the dynamic viscosity, and which is defined as $R = \rho \bar{v} d / \mu$ wherein $\rho$ is the density of the liquid, $\bar{v}$ is the speed, d the diameter of the tube through which the flow runs and $\mu$ the viscosity. In order to ensure that measurements made from the measurement flow are representative for what occurs in the main flow, the main flow must also be laminar. The latter can be achieved by introducing a so-called laminar flow element into the flow. The fluid is forced to flow through the channels present in the element, which are dimensioned in such a manner that the Reynolds number is lower than 2300 and a laminar flow therefor arises. The measuring channel is installed parallel to the main flow. As long as there is a laminar flow it applies that according to Poiseuille's law the flow speed in such flow is proportional to the drop in pressure and inversely proportional to the viscosity; the ratio between the flows in the main channel and the measurement channel can now be determined.

In the aforementioned patent, a laminar flow element is described in detail. This element is constructed of piled-up plates with inflow and outflow opening(s) and with grooves, or channels therein, respectively.

In the case of a device as described in the said patent the in-going flow—i.e. the flow which is led towards the laminar flow element —is in general not laminar and turbulences occur therein. If a flow containing turbulences feeds a laminar flow element, then that is less favourable than when the ingoing flow is already entirely or mainly laminar. This expresses itself in particular in the quantity of fluid which is to be measured per minute: if turbulences are present the quantity of fluid which is to be measured per unit of time is smaller if a certain laminar flow element is used that when the ingoing flow is laminar.

One attempted solution for this problem has been in the use of a front turbulence filter, upstream from the laminar flow element. However, this proposed solution did not resolve the problem.

SUMMARY OF THE INVENTION

The device according to the invention provides a solution in this respect and to that end the inflowing fluid flows through at least one combination, which forms an entirety with the device, of a turbulence filter with the appurtaining settling chamber situated behind it, before flowing into the part where the fluid flow is laminar. The invention is therefore a device which contains both the measurement element and the turbulence filter as integral parts. In the turbulence filter the flow is turned into what is principally a laminar flow. In the settling chamber behind the filter the flow remains laminar so that it reaches the laminar flow element as a laminar flow. It should be noted that the integrated filter with the settling chamber can also be used in configurations in which a sensor is situated at the place of the laminar flow element, or in which a sensor is used in combination with the flow element.

A preferred embodiment of a device according to the invention is one in which a laminar flow element is situated in the part where the fluid flow is laminar, containing at least one set of small plates which are piled on top of one another, each of which is equipped with at least two openings, these being an inflow opening and an outflow opening. Between the openings is a (first) part of the plate which is equipped on one side with mainly parallel grooves which run from the one opening to the other, and which plates are piled on top of each other in such a manner that the grooves form channels of such dimensions that the fluid flows in a laminar manner through them and that the openings form entrance and exit channels respectively of the set. In short, a device as described in the aforesaid U.S. Pat. No. 4,427,030 is improved with the combination of a turbulence filter and appurtaining settling chamber situated between the inflow opening and the laminar flow element is formed by a piling-up of (second) plate parts with settling openings situated behind them, seen in the direction of the flow, both constituting a part of the said flat plates, whereby those second plate parts are equipped on the same side as the first plate parts, with grooves which run mainly parallel, and which run from the inflow opening to the settling opening and which, when in a piled-up state, form channels of such dimensions that the fluid reaches the laminar flow element as an, at least mainly, laminar flow.

The inention is thus a device, with an integrated turbulence filter, which filter works according to the same principle as that which lies at the basis of the construction of the laminar flow measurement element.

The improvement which is reached in the case of use of a device according to the invention, compared to a device in which no turbulence filter, is spectacular. The area across which the relationship between the pressure difference which occurs and the flow—and also the relationship between the temperature difference in a sensor and the flow—is linear, extends to considerably larger flows, results in a considerable increase in of the quantity of the fluid which is to be measured per minute. As a specific example, an increase from 100 l/minute to 300 l/minute can be achieved; a three fold increase.

Devices which work according to the principle of the invention can have many forms of design and configuration, depending on the requirements which are laid down for a specific application. For example, more turbulence filters can be built-in, connected either "in series", each with an appurtaining settling chamber, alternatively, several filters can be used in the same settling chamber. As a example of another configuration the settling chamber can be placed first in the direction to the flow behind the place where the measurement is made, such as behind the laminar flow meter, with a turbulence filter behind it. This avoids a so-called flow-back of the fluid.

Practice has shown that a very good operation is achieved with a device built-up of approximately 150 small plates of stainless steel or nickel, each with a thickness of approximately 200 microns. When the number of plates is 500, a measurement capacity of up to 1500 l/minute can be achieved.

The grooves in the plates can be made in various manners—for example with the aid of an etching procedure or also by having electrolytic material deposited on the flat surface of plate material. While the grooves are in general equidistant, other groove—and therefore channel—shapes are also possible.

A turbulence filter, integrated with a flow meter according to the invention, can also include a porous material, such as a sintered (plastic) material or ceramic material. It can also consist of a woven material.

BRIEF DESCRIPTION OF THE DRAWINGS

The invention will be explained further with the aid of the drawings, in which.

DESCRIPTION OF THE PREFERRED EMBODIMENTS

Figure 1:
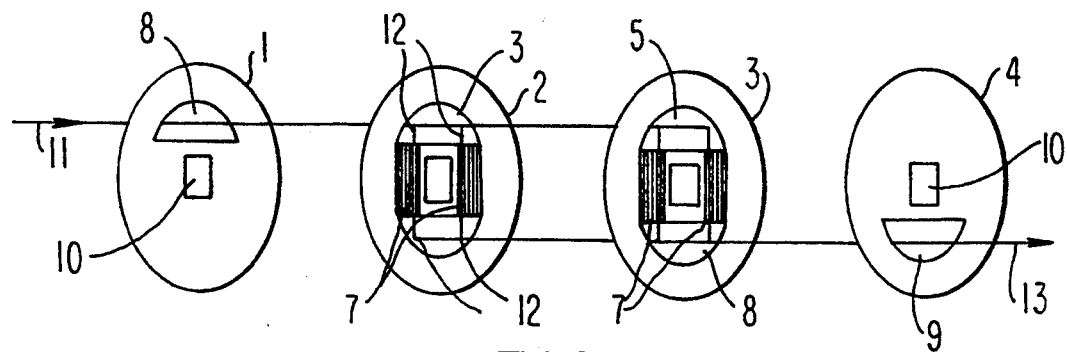
FIG. 1 schematically shows a known laminar flow element.

A laminar flow element for measuring pressure differences or mass portion in fluid flows is shown schematically in FIG. 1. The figure shows how the element is built-up with the aid of plates. As shown, 4 plates are illustrated: the flow plates 2 and 3 and the closing plates 1 and 4. The plates 2 and 3 are both equipped with openings 3 and 5, or 5A and 6 respectively. Grooves 7 run between these openings in a side—in the drawing: the front—of the plate. The closing plates 1 and 4 each have one opening, 8 and 9 respectively. The flow element is built-up by connecting the plates 1 to 4 on top of one another, for example with the aid of the central opening 10 which has been made. The flow element is therefore a set of plates. The closing plates, 1 and 4 respectively, are mounted at the front and the rear sides of the set; those closing plates are not equipped with grooves. As a result of the fact that the plates are laid close up against one another, the grooves 7 in the set in each of the flow plates 2 and 3 are always closed-off by a neighbouring plate; in this way the channels are formed, through which the fluid can flow. A fluid will flow into the element through entrance opening 8. As a result of the fact that the flow will come up against the rear closing plate 4 at the other end of the element, the flow will start to run through the grooves/channels 7, which come-out in the exit openings 5A and 6, and that flow will finally leave the element again via the exit opening 9. The manner in which the flow moves through the element is shown by the arrows which are drawn: 11 is the incoming flow; the small arrows 12 show the direction of flow inside the element and 13 shows the outgoing flow.

It is known how the flow resistance of such a laminar flow element depends on the number of piled-up plates, and therefore how that resistance can be varied.

It is also known how the principle of a measuring element as indicated here can be applied in all sorts of designs of the element and how networks of such elements, in analogy with electrical networks, can be used.

Figure 2A:
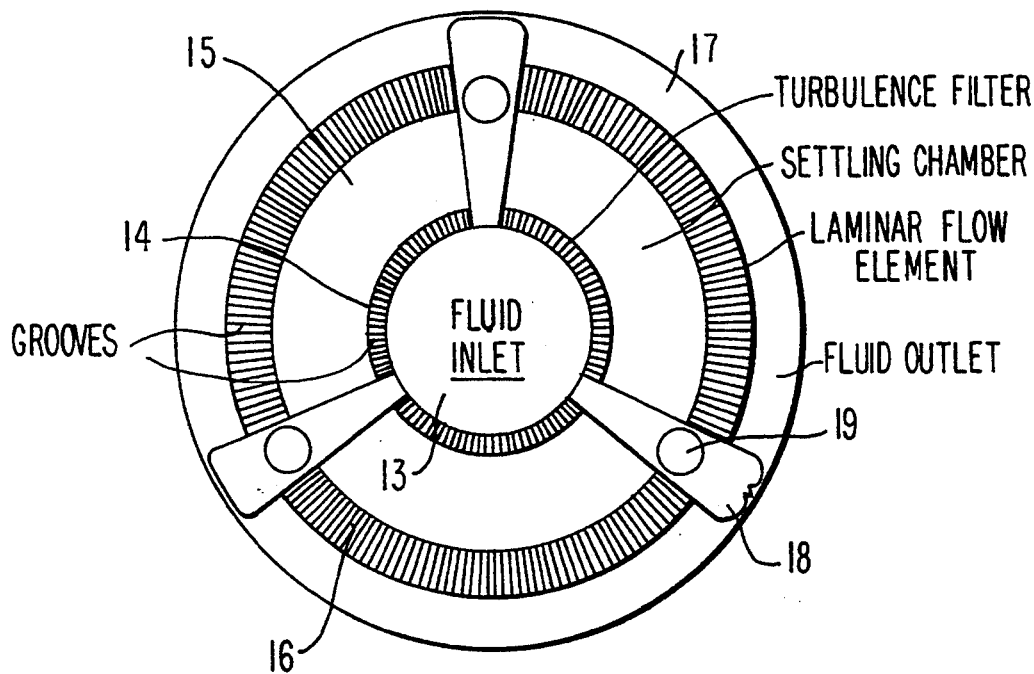
FIG. 2a shows a front view of a plate which serves as a construction element for a measuring device according to the invention.

FIG. 2a shows a front view of an example of a design of a plate which can serve as a construction block for a measuring device according to the invention. In the same manner as is shown in FIG. 1, the plates are united into a set by means of piling them up and with the aid of closing plates 30 at the ends as illustrated in FIG. 2b.

The fluid enters the measuring device via 13 and then flows through the channels 14 of a filter integrated in the plate which works as a turbulence filter, to the settling chamber 15. The filter 14 works as a laminar flow element, so that the fluid reaches the laminar flow element 16 as a laminar flow from the settling chamber. From there it flows in the known manner via the outflow opening 17 out of the measuring device to the outside. 18 shows the connecting parts which hold the plates together. The holes 19 serve to be able to pile-up the plates and to then keep them piled-up.

Figure 2B:
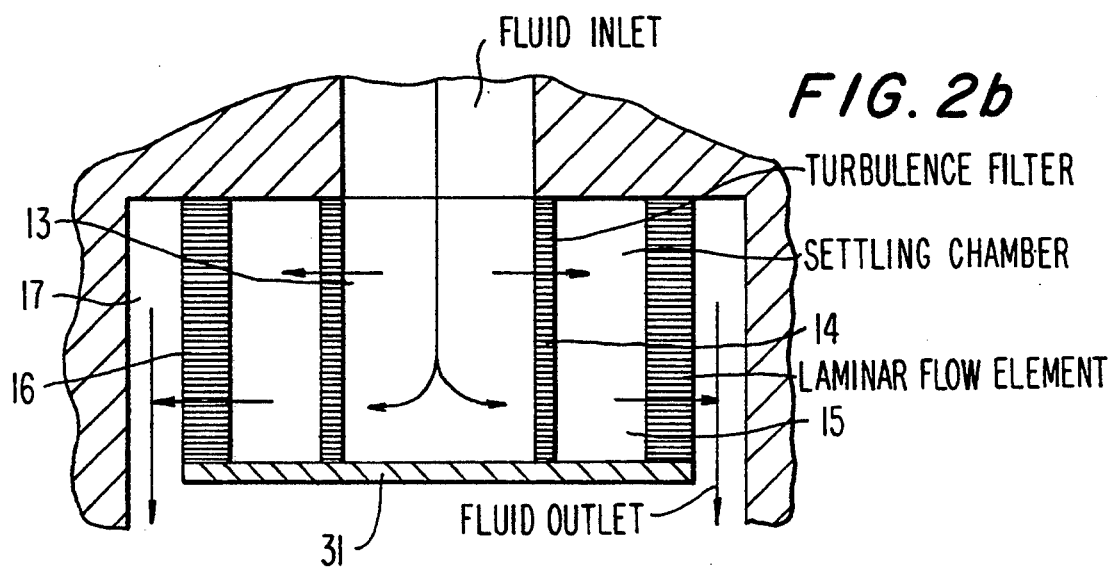
FIG. 2b shows a perpendicular cross-section of the same such device.
Figure 2C:
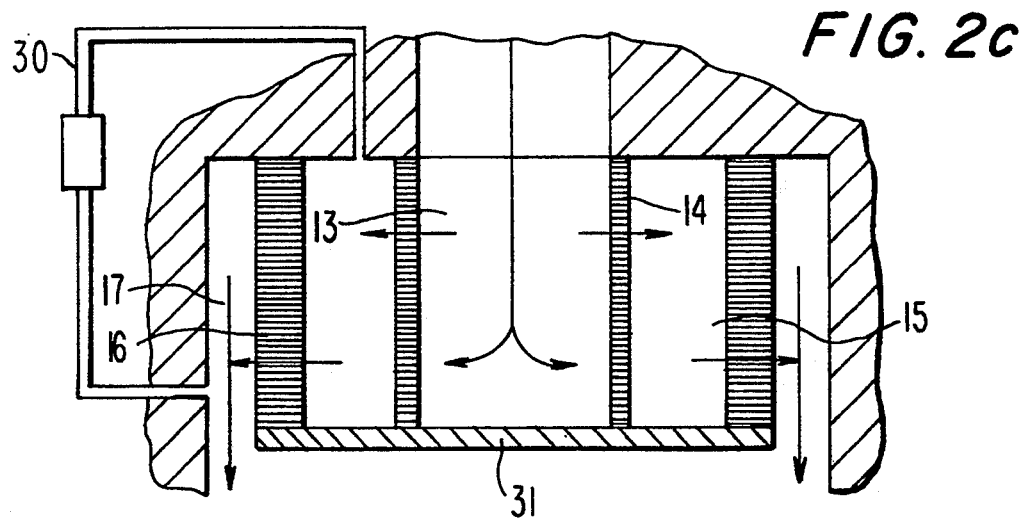
FIG. 2c is a view similar to FIG. 2b showing the presence of a bypass flow measuring channel.

FIG. 2b shows a cross-section, perpendicular to the plate drawn in FIG. 2a, through the measuring device, which can be built up from the plates according to FIG. 2a; compared with FIG. 2a the same reference numbers have been used for the corresponding parts.

It can be advantageous, when the flow has passed the laminar flow element, to first send it through a second settling chamber with a turbulence filter behind it, this in order to dampen the flow and thus avoid the so-called "flow-back".

Figure 3:
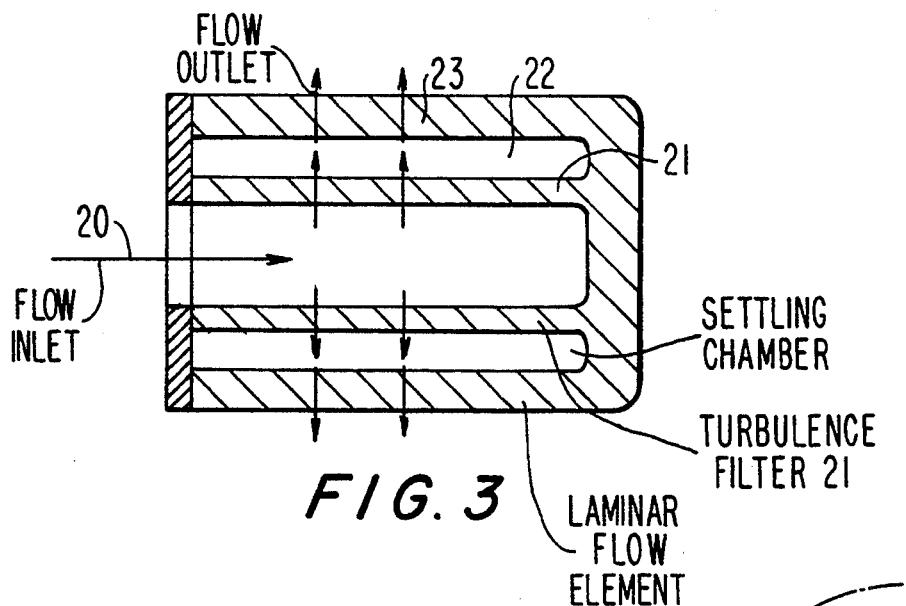
FIG. 3 shows a particular preferable design of a device according to the invention.

In the design of the device drawn in FIG. 3, the incoming flow 20 flows via the turbulence filter 21 into the settling chamber 22 and from there as a laminar flow through the laminar flow element 23 outside again.

Figure 4A:
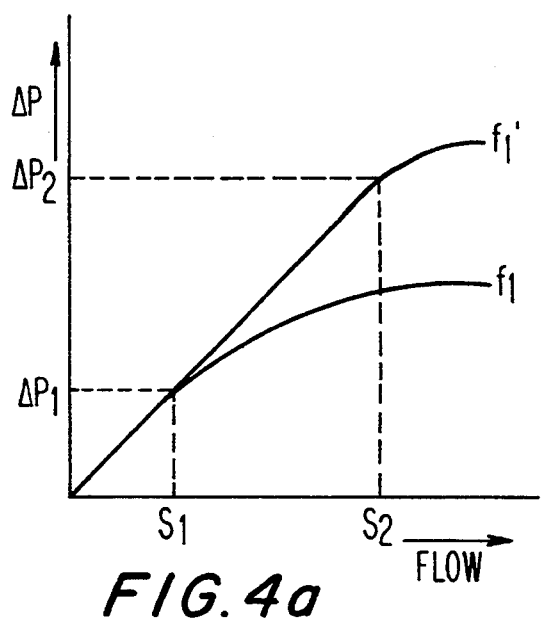
FIG. 4a shows the connection between the pressure difference which is to be measured in a sensor or mass portion and the flow, whereby a known device is compared with a device according to the invention.

The graph of FIG. 4a shows the relationshop for a particular gas between the pressure difference or mass portion P which is to be measured and the fluid flow S this in accordance with Poiseuille's law. The area across which the relationship between P and S is linear is the area of laminar flow.

If the P measurement is made without a filter which is integrated with a laminar flow element being used, then the relationship for the fluid—see curve f1—between P and S is linear up to a flow with a size of S1, whereby a pressure difference or mass portion of P belongs (in a design example, in which the fluid was N2, S1 was: 100 l/m.)

With the use of an integrated filter according to the invention, the connection between P and S remains linear for very large flows, namely up to S2 (see FIG. 4a) wherein in the case of N2 referred to above: S2=300 l/m.).

Figure 4B:
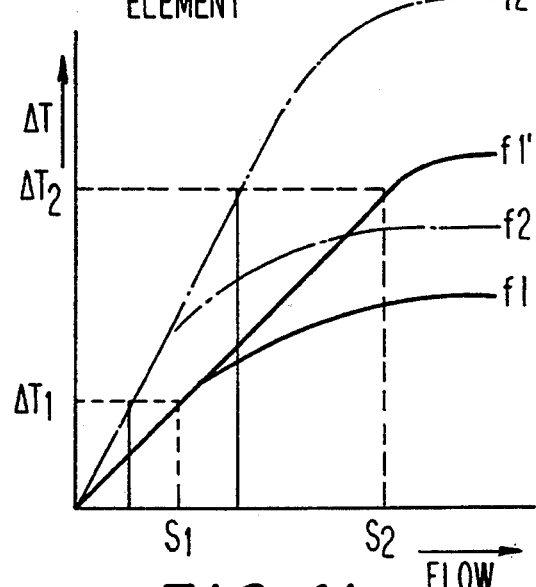
FIG. 4b shows the connection between the temperature difference and the flow, whereby a known device is compared with a device according to the invention for 2 fluids.
Figure 5:
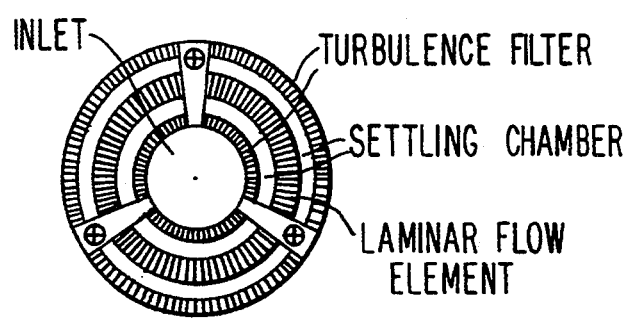
FIG. 5 shows a perpendicular cross-section of another embodiment of the invention.

FIG. 4b shows the connection between T (temperature) and S for two fluids, f1 and f2. The curves f1 and f2 relate to the situation in which no filter was used; the curves f1' and f2', to the situation in which a filter was used. This was done to show what influence the use of a filter in accordance with the present invention has on the so-called conversion factor. The conversion factor relates to the relationship of the portions which correspond to different fluids with the same T. If, for example, a device according to the invention has been calibrated with the aid of nitrogen and an argon flow is measured, a particular T turns out to correspond with 100 l/min. for nitrogen and with 150 l/min for argon; resulting therefore in a conversion factor of 1.5.

The influence of the application of the invention is that the conversion faction is constant across a larger area of T and P. One can say: the two curves which show the connection between T and P respectively and the portions both run across a larger area in a straight line.

I claim:

1. An instrument for measuring mass flow or pressure difference in a fluid stream, comprising:
    a body having an inlet for the fluid stream;
    inside the body a device comprising a turbulence filter for receiving the fluid steam and for forming downstream a laminar flow, a settling chamber downstream of the turbulence filter for receiving and maintaining the laminar flow, and a laminar flow element integrated with the turbulence filter and situated downstream of the settling chamber for maintaining the laminar flow;
    an outlet downstream of the laminar flow element;
    said device comprising at least one set of plates piled on top of each other, each plate having inflow and outflow openings for the fluid stream, a part of each plate having on one side first and second spaced substantially parallel groove sets which run from the inflow opening to the outflow opening, said plates being piled on top of each other such that said grooves form channels of such dimensions that the fluid stream flows through them in a laminar manner, the first groove set forming the turbulence filter, the space between the first and second groove sets forming the settling chamber, the second groove set forming the laminar flow element;
    means including said body for directing the fluid flow through the turbulence filter, settling chamber and laminar flow element in a straight line;
    means for coupling a flow measuring sensor between the settling chamber and a device region downstream of the second groove set.

2. An instrument according to claim 1, wherein the first groove set is aligned in a straight line with the second groove set.

3. An instrument according to claim 2, wherein the thickness of each plate is approximately 200 microns and the number of plates in the set is approximately 150.

4. An instrument according to claim 1, wherein the plates are manufactured from stainless steel or nickel.

5. An instrument according to claim 1, wherein the first and second groove sets are concentric with the first groove set within the second groove set, the body inlet and outlet being arranged such that the fluid stream flows radially.

6. An instrument according to claim 1, wherein downstream of the laminar flow element is provided a second turbulence filter to avoid back-flow.

* * * * *